United States Patent
Wang et al.

(10) Patent No.: US 9,206,809 B2
(45) Date of Patent: Dec. 8, 2015

(54) ELECTRONIC DEVICE, AND CONTROL DEVICE AND METHOD FOR CONTROLLING FAN EMPLOYED IN THE ELECTRONIC DEVICE

(71) Applicant: HON HAI PRECISION INDUSTRY CO., LTD., New Taipei (TW)

(72) Inventors: Cho-Hao Wang, New Taipei (TW); Chih-Huang Wu, New Taipei (TW)

(73) Assignees: Patentcloud Corporation, Shenzhen (CN); Patentcloud Co. Limited, Kwun Tong (HK)

( * ) Notice: Subject to any disclaimer, the term of this patent is extended or adjusted under 35 U.S.C. 154(b) by 86 days.

(21) Appl. No.: 14/259,242

(22) Filed: Apr. 23, 2014

(65) Prior Publication Data

US 2014/0314566 A1    Oct. 23, 2014

(30) Foreign Application Priority Data

Apr. 23, 2013  (TW) .............................. 102114471 A

(51) Int. Cl.
  *G05D 23/00*   (2006.01)
  *F04D 27/00*   (2006.01)
  *F04D 25/06*   (2006.01)

(52) U.S. Cl.
  CPC .......... *F04D 27/001* (2013.01); *F04D 25/0613* (2013.01); *F04D 27/004* (2013.01); *F04D 27/008* (2013.01)

(58) Field of Classification Search
  CPC .......... F01P 7/048; F01P 7/08; F04D 25/166; F04D 27/004; H02H 3/44; H02H 7/0816; H02P 6/08; H02P 2209/07; H02P 6/142; H02P 6/20

USPC .............. 318/400.11, 400.13, 400.01, 471; 416/1, 35; 388/820; 361/91.1, 93.1

See application file for complete search history.

(56) References Cited

U.S. PATENT DOCUMENTS

| | | | | |
|---|---|---|---|---|
| 6,748,162 | B2 * | 6/2004 | Poutot ..................... | F01P 7/048 123/41.49 |
| 7,667,428 | B2 * | 2/2010 | Wei ......................... | H02H 3/44 318/59 |
| 7,834,571 | B2 * | 11/2010 | Lin .......................... | H02P 6/08 318/268 |
| 2002/0155804 | A1 * | 10/2002 | Poutot ..................... | F01P 7/048 454/75 |
| 2007/0285859 | A1 * | 12/2007 | Wei ......................... | H02H 3/44 361/91.1 |
| 2008/0075440 | A1 * | 3/2008 | Lin .......................... | H02P 6/08 388/820 |
| 2010/0181951 | A1 * | 7/2010 | Noie ........................ | H02P 6/20 318/400.11 |
| 2010/0308760 | A1 * | 12/2010 | Nakamura .............. | H02P 6/142 318/400.11 |

* cited by examiner

*Primary Examiner* — Paul Ip
(74) *Attorney, Agent, or Firm* — Novak Druce Connolly Bove + Quigg LLP

(57) ABSTRACT

An electronic device includes a fan and a control device for controlling the fan. The control device includes a control unit, a first signal generation unit and a second signal generation unit each connected to the fan. The control unit has a first signal output terminal and a second signal output terminal. In use, the control unit first enables the first signal output terminal to generate a speed adjusting signal to control the fan. The control unit further detects whether a speed measurement signal is received from the fan, and enables the second signal output terminal to generate the speed adjusting signal to control the fan, if no speed measurement signal is received.

11 Claims, 2 Drawing Sheets

ELECTRONIC DEVICE, AND CONTROL DEVICE AND METHOD FOR CONTROLLING FAN EMPLOYED IN THE ELECTRONIC DEVICE

FIELD

The present disclosure relates to electronic technology, and particularly to an electronic device, and a control device and a method for controlling a fan employed in the electronic device.

BACKGROUND

Most electronic devices, such as computers, use fans for radiating heat, to prevent chips from being damaged by overheating, ensuring their system works stability at room temperature.

BRIEF DESCRIPTION OF THE DRAWINGS

Many aspects of the embodiments described herein can be better understood with reference to the following drawings. The components in the drawings are not necessarily drawn to scale, the emphasis instead being placed upon clearly illustrating the principles of the present disclosure. Moreover, in the drawings, like reference numerals designate corresponding parts throughout the several views.

DETAILED DESCRIPTION

The present disclosure, including the accompanying drawings, is illustrated by way of examples and not by way of limitation. It should be noted that references to "an" or "one" embodiment in this disclosure are not necessarily to the same embodiment, and such references mean "at least one".

Figure 1:
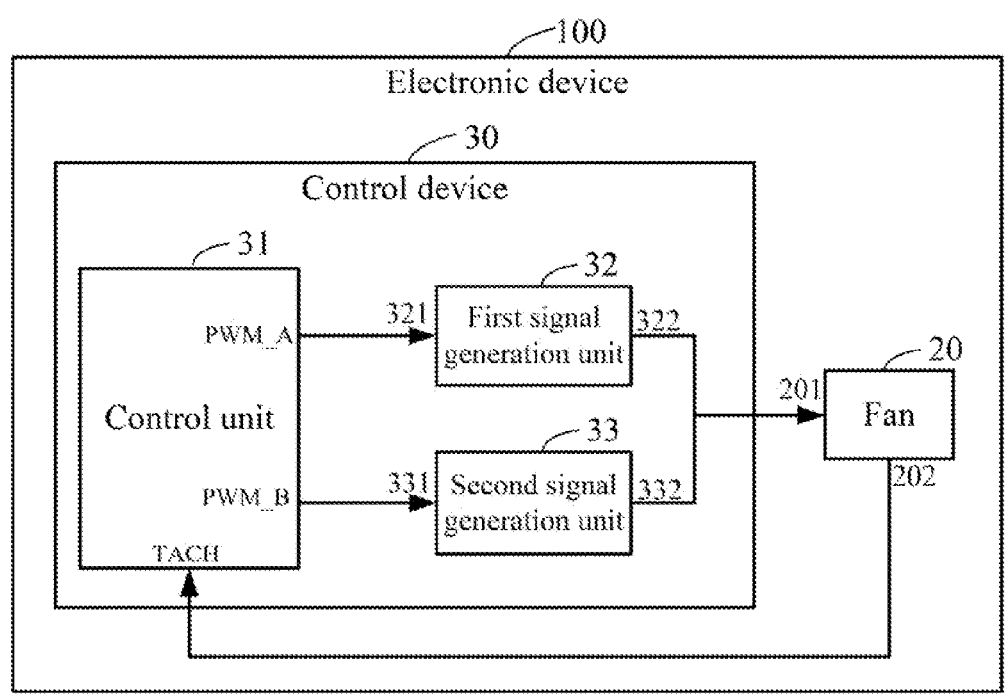
FIG. 1 is a block diagram of one embodiment of an electronic device, which includes a fan and a control device.

FIG. 1 illustrates a block diagram of one embodiment of an electronic device 100. The electronic device 100 includes a fan 20 and a control device 30. The control device 30 can detect and adjust the speed of the fan 20.

The control device 30 includes a control unit 31, a first signal generation unit 32 and a second signal generation unit 33. In the embodiment, both of the first signal generation unit 32 and the second signal generation unit 33 can generate a speed adjusting signal. In at least one embodiment, both of the first signal generation unit 32 and the second signal generation unit 33 can be a pulse width modulation (PWM) signal generating circuit, which can be configured to generate a PWM modulation signal. In the embodiment, the first signal generation unit 32 is a main circuit for generating the speed adjusting signal, and the second signal generation unit 33 is a backup circuit which is used for generating the speed adjusting signal when the first signal output terminal PWM_A of the control unit 31 is abnormal.

In at least one embodiment, the control unit 31 includes a first signal output terminal PWM_A, a second signal output terminal PWM_B, and a signal input terminal TACH. In the embodiment, the first signal output terminal PWM_A is connected to an input terminal 321 of the first signal generation unit 32, and the second signal output terminal PWM_B is connected to an input terminal 331 of the second signal generation unit 33. Both of an output terminal 322 of the first signal generation unit 32 and an output terminal 332 of the second signal generation unit 33 are connected to an input terminal 201 of the fan 20. An output terminal 202 of the fan is connected to the signal input terminal TACH of the control unit 31. In the embodiment, in an initial state, the first signal output terminal PWM_A is enabled, and the second signal output terminal PWM_B is disabled.

In at least one embodiment, the control device 30 can output the speed adjusting signal to control the fan 20. The fan 20 can measure a speed and generate a speed measurement signal and send the speed measurement signal back to the control device 30 for monitoring, such that the control device 30 can both adjust and monitor the speed of the fan 20.

Figure 2:
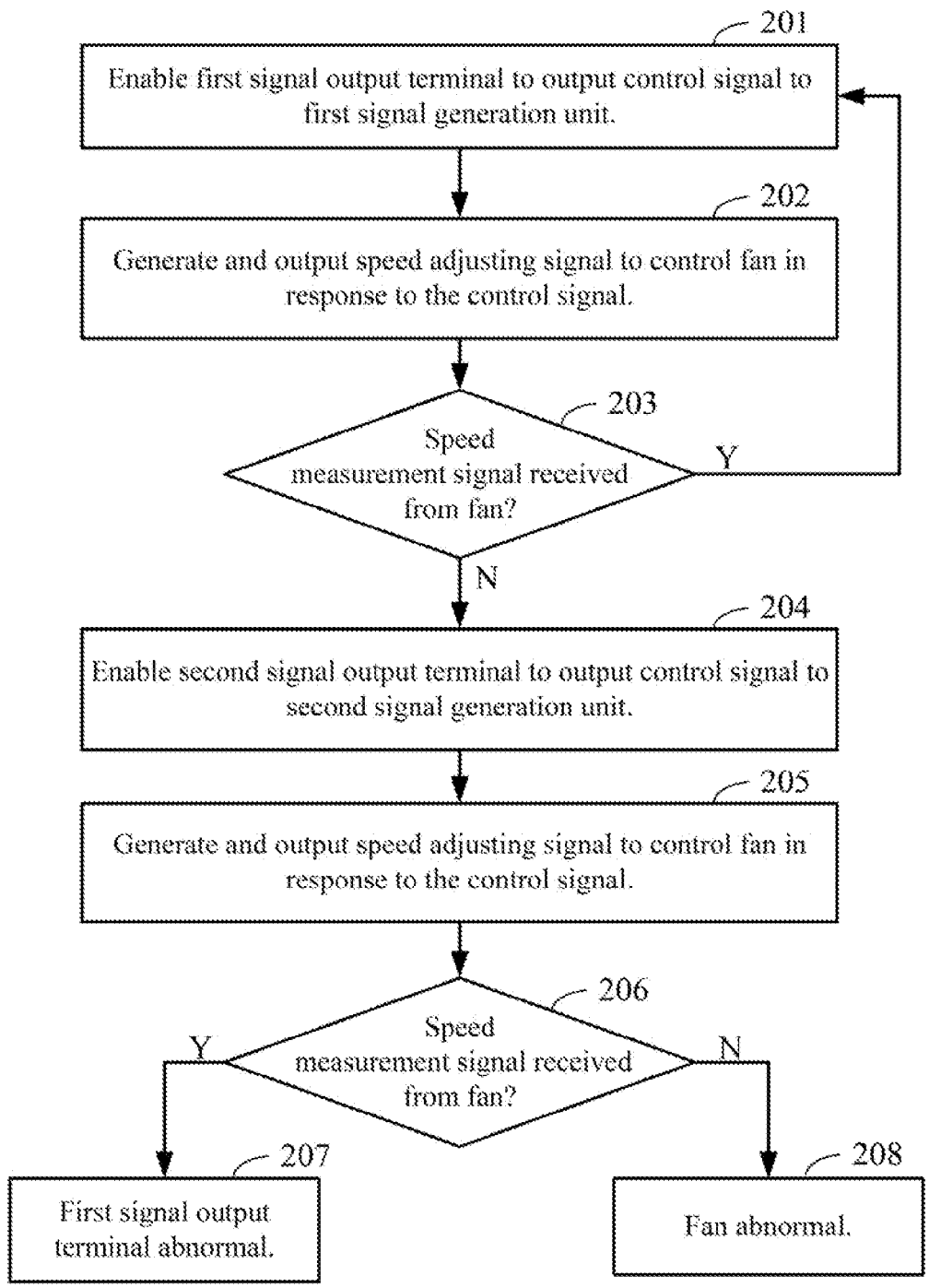
FIG. 2 is a flowchart of one embodiment of a method for controlling the fan using the control device of FIG. 1.

FIG. 2 illustrates a method for controlling the fan 20 using the control device 30.

In 201, the control unit 31 can first enable the first signal output terminal PWM_A to output a control signal to the first signal generation unit 32.

In 202, the first signal generation unit 32 can generate the speed adjusting signal in response to receiving the control signal, and output the speed adjusting signal to the fan to control the fan 20.

In 203, the control unit 31 detects whether the signal input terminal TACH receives a speed measurement signal from the fan 20. If the control unit 31 detects the signal input terminal TACH receives a speed measurement signal, the process goes back to 201. Otherwise, if the control unit 31 detects the signal input terminal TACH does not receive any speed measurement signal, 204 is implemented.

In 204, the control unit 31 can further enable the second signal output terminal PWM_B to output the control signal to the second signal generation unit 33.

In 205, the second signal generation unit 33 can generate the speed adjusting signal in response to receiving the control signal, and output the speed adjusting signal to the fan to control the fan 20.

In 206, the control unit 31 detects whether the signal input terminal TACH receives a speed measurement signal from the fan 20. If the control unit 31 detects the signal input terminal TACH receives a speed measurement signal, 207 is implemented. Otherwise, if the control unit 31 detects the signal input terminal TACH does not receive any speed measurement signal, 208 is implemented.

In 207, the control unit 31 determines the first signal output terminal PWM_A is abnormal, and generates a first failure signal to alarm the failure of the first signal output terminal PWM_A.

In 208, the control unit 31 determines that the fan 20 is abnormal, and generates a second failure signal to alarm the failure of the fan 20.

Therefore, the states of the control unit 31 and the fan 20 can be monitored by the control unit 31, and when the first signal output terminal PWM_A is abnormal, the fan 20 can still work under the control of the control unit 31.

It is to be understood that the foregoing disclosure may be embodied in other forms without departing from the scope thereof. Thus, the present examples and embodiments are to be considered in all respects as illustrative and not restrictive of the following claims.

What is claimed is:

1. A method for controlling a fan using a control device, the control device comprising a control unit, a first signal generation unit and a second signal generation unit each connected to the fan, the control unit having a first signal output terminal and a second signal output terminal, the method comprising:

enabling the first signal output terminal to output a control signal to the first signal generation unit, using the control unit;

generating and outputting a speed adjusting signal to control the fan, in response to the control signal, using the first signal generation unit;

detecting whether a speed measurement signal is received from the fan using the control unit; and if no speed measurement signal is received, enabling the second signal output terminal to output the control signal to the second signal generation unit using the control unit;

generating and outputting the speed adjusting signal to control the fan, in response to the control signal, using the second signal generation unit.

2. The method as described in claim 1, wherein after the second signal generation unit generating and outputting the speed adjusting signal to control the fan, the method further comprises:

detecting whether a speed measurement signal is received from the fan using the control unit; and if a speed measurement signal is received, determining the first signal output terminal is abnormal, and generating a first failure signal to alarm the failure of the first signal output terminal, using the control unit.

3. The control device as described in claim 2, wherein if no speed measurement signal is received, the control unit determines that the fan is abnormal, and generates a second failure signal to alarm the failure of the fan.

4. A control device for controlling a fan, the control device comprising:

a first signal generation unit and a second signal generation unit connected to the fan; and a control unit comprising:
  a first signal output terminal connected to the first signal generation unit;
  a second signal output terminal connected to the second signal generation unit; and
  a signal input terminal connected to the fan;

wherein, the control unit first enables the first signal output terminal to output a control signal to the first signal generation unit, the first signal generation unit generates and outputs a speed adjusting signal to control the fan; the control unit further detects whether the signal input terminal receives a speed measurement signal from the fan, if the control unit detects the signal input terminal does not receive any speed measurement signal, the control unit further enables the second signal output terminal to output the control signal to the second signal generation unit, the second signal generation unit generates and outputs the speed adjusting signal to control the fan.

5. The control device as described in claim 4, wherein after the second signal generation unit generates and outputs the speed adjusting signal to control the fan, the control unit further detects whether the signal input terminal receives a speed measurement signal from the fan, if the control unit detects the signal input terminal receives a speed measurement signal, the control unit determines the first signal output terminal is abnormal, and generates a first failure signal to alarm the failure of the first signal output terminal.

6. The control device as described in claim 5, wherein if the control unit detects the signal input terminal does not receive any speed measurement signal, the control unit determines that the fan is abnormal, and generates a second failure signal to alarm the failure of the fan.

7. The control device as described in claim 4, wherein each of the first signal generation unit and the second signal generation unit is a pulse width modulation signal generating circuit.

8. An electronic device, comprising:

a fan; and a control device for controlling the fan, the control device comprising:

a first signal generation unit and a second signal generation unit connected to the fan; and a control unit comprising:
  a first signal output terminal connected to the first signal generation unit;
  a second signal output terminal connected to the second signal generation unit; and
  a signal input terminal connected to the fan;

wherein, the control unit first enables the first signal output terminal to output a control signal to the first signal generation unit, the first signal generation unit generates and outputs a speed adjusting signal to control the fan; the control unit further detects whether the signal input terminal receives a speed measurement signal from the fan, if the control unit detects the signal input terminal does not receive any speed measurement signal, the control unit further enables the second signal output terminal to output the control signal to the second signal generation unit, the second signal generation unit generates and outputs the speed adjusting signal to control the fan.

9. The electronic device as described in claim 8, wherein after the second signal generation unit generates and outputs the speed adjusting signal to control the fan, the control unit further detects whether the signal input terminal receives a speed measurement signal from the fan, if the control unit detects the signal input terminal receives a speed measurement signal, the control unit determines the first signal output terminal is abnormal, and generates a first failure signal to alarm the failure of the first signal output terminal.

10. The electronic device as described in claim 9, wherein if the control unit detects the signal input terminal does not receive any speed measurement signal, the control unit determines that the fan is abnormal, and generates a second failure signal to alarm the failure of the fan.

11. The electronic device as described in claim 8, wherein each of the first signal generation unit and the second signal generation unit is a pulse width modulation signal generating circuit.

* * * * *